(12) United States Patent
Takeda et al.

(10) Patent No.: US 7,441,003 B1
(45) Date of Patent: Oct. 21, 2008

(54) PAYMENT BASED ELECTRONIC MAIL PRINTING SYSTEM UTILIZING SEARCH CRITERIA

(75) Inventors: Masaru Takeda, Kawasaki (JP); Kohei Genda, Kawasaki (JP); Yasuyuki Toki, Kawasaki (JP); Hironobu Nagayama, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 880 days.

(21) Appl. No.: 09/716,415

(22) Filed: Nov. 21, 2000

(30) Foreign Application Priority Data

Apr. 17, 2000 (JP) ............................ 2000-114683

(51) Int. Cl.
G06F 15/16 (2006.01)
(52) U.S. Cl. .................................. 709/206
(58) Field of Classification Search ............... 709/206, 709/207, 241, 208, 219, 220, 203, 226, 245; 713/201; 707/3, 10; 379/100.08, 67.1; 358/1.13, 358/1.15, 1.18, 434, 402; 714/44; 705/30, 705/26; 455/556.2, 557
See application file for complete search history.

(56) References Cited

U.S. PATENT DOCUMENTS

| | | | |
|---|---|---|---|
| 5,832,191 A * | 11/1998 | Thorne ...................... 358/1.15 |
| 5,832,208 A * | 11/1998 | Chen et al. .................. 713/201 |
| 5,920,404 A * | 7/1999 | Weiser ........................ 358/434 |
| 6,023,700 A * | 2/2000 | Owens et al. ................. 707/10 |
| 6,157,706 A * | 12/2000 | Rachelson ............. 379/100.08 |
| 6,160,631 A * | 12/2000 | Okimoto et al. ............ 358/1.15 |
| 6,167,449 A * | 12/2000 | Arnold et al. ............... 709/227 |
| 6,223,226 B1* | 4/2001 | Miyahara .................... 709/241 |
| 6,306,252 B1* | 10/2001 | Ryham ........................ 162/47 |
| 6,307,643 B1* | 10/2001 | Okada et al. ............... 358/1.15 |
| 6,421,716 B1* | 7/2002 | Eldridge et al. ............. 709/219 |
| 6,452,689 B1* | 9/2002 | Srinivasan .................. 358/1.15 |

(Continued)

FOREIGN PATENT DOCUMENTS

EP 1056247 A2 * 11/2000

(Continued)

OTHER PUBLICATIONS

Tektronix, "PhaserLink Remote Internet Printing Software" User Manual, Nov. 1999, 52 pages.*

(Continued)

*Primary Examiner*—Andrew Caldwell
*Assistant Examiner*—Grant Ford
(74) *Attorney, Agent, or Firm*—Oliff & Berridge, PLC

(57) ABSTRACT

An information output system in which an output destination management server is provided with an output destination management table for managing a mail address, performance information, and the like for each printer. In response to a search request from a terminal apparatus, the output destination management table is used to search for one or a plurality of candidate printers. The terminal apparatus is notified of the mail address of one candidate printer or the plurality of candidate printers. The terminal apparatus uses the mail address of a designated printer as a destination, and issues an electronic mail including the information to be printed. A printing mail server receives the electronic mail. The information included in the electronic mail is transferred to the designated printer from a print server. Accounting processing is executed prior to the printing of the information.

18 Claims, 14 Drawing Sheets

U.S. PATENT DOCUMENTS

| | | |
|---|---|---|
| 6,453,692 B1 * | 9/2002 | Kim et al. .................. 62/229 |
| 6,470,332 B1 * | 10/2002 | Weschler ..................... 707/3 |
| 6,487,189 B1 * | 11/2002 | Eldridge et al. ............ 370/338 |
| 6,512,593 B1 * | 1/2003 | Yashiki ..................... 358/1.15 |
| 6,519,048 B1 * | 2/2003 | Tanaka ...................... 358/1.13 |
| 6,522,421 B2 * | 2/2003 | Chapman et al. ........... 358/1.15 |
| 6,542,892 B1 * | 4/2003 | Cantwell .................... 707/10 |
| 6,581,092 B1 * | 6/2003 | Motoyama et al. .......... 709/219 |
| 6,581,094 B1 * | 6/2003 | Gao ......................... 709/220 |
| 6,587,219 B1 * | 7/2003 | Saito et al. ................. 358/1.15 |
| 6,618,749 B1 * | 9/2003 | Saito et al. ................. 709/207 |
| 6,622,266 B1 * | 9/2003 | Goddard et al. .............. 714/44 |
| 6,785,015 B1 * | 8/2004 | Smith et al. ................ 358/1.15 |
| 6,806,977 B1 * | 10/2004 | Freeny et al. ............... 358/1.15 |
| 6,980,319 B2 * | 12/2005 | Ohta ........................ 358/1.18 |
| 7,010,635 B1 * | 3/2006 | Phillips et al. .............. 710/305 |
| 7,028,102 B1 * | 4/2006 | Larsson et al. .............. 709/246 |
| 7,076,255 B2 * | 7/2006 | Parupudi et al. ........... 455/456.1 |
| 2001/0017712 A1 * | 8/2001 | Kasatani ..................... 358/1.15 |
| 2002/0002592 A1 | 1/2002 | Aoki et al. |
| 2002/0013870 A1 | 1/2002 | Aoki et al. |
| 2002/0026479 A1 | 2/2002 | Aoki et al |
| 2002/0032652 A1 | 3/2002 | Aoki et al. |
| 2002/0049870 A1 | 4/2002 | Aoki et al. |
| 2002/0055924 A1 * | 5/2002 | Liming ...................... 707/100 |
| 2002/0063693 A1 | 5/2002 | Aoki et al. |
| 2002/0078160 A1 * | 6/2002 | Kemp et al. ................ 709/208 |
| 2003/0097430 A1 * | 5/2003 | Matsukura .................. 709/221 |
| 2004/0246517 A1 * | 12/2004 | Parry ........................ 358/1.15 |
| 2005/0219607 A1 * | 10/2005 | Yamaguchi et al. ......... 358/1.15 |

FOREIGN PATENT DOCUMENTS

| | | | |
|---|---|---|---|
| JP | 06-077994 | 3/1994 | |
| JP | 07-006005 | 1/1995 | |
| JP | 09-027822 | 1/1997 | |
| JP | 9-200367 | 7/1997 | |
| JP | 09-284847 | 10/1997 | |
| JP | 10-063601 | 3/1998 | |
| JP | 10-191453 | 7/1998 | |
| JP | 10-222527 | 8/1998 | |
| JP | 10-240637 | 9/1998 | |
| JP | 10-254982 | 9/1998 | |
| JP | 10-322509 | 12/1998 | |
| JP | 11-146118 | 5/1999 | |
| JP | 11-191081 | 7/1999 | |
| JP | 11-234464 | 8/1999 | |
| JP | 11-249847 | 9/1999 | |
| JP | 11-288403 | 10/1999 | |
| JP | 11-312068 | 11/1999 | |
| JP | 11312065 A * | 11/1999 | |
| JP | 11312068 A * | 11/1999 | |
| JP | 11-334180 | 12/1999 | |
| JP | 2001282679 A * | 10/2001 | |
| WO | WO 01/33365 | 5/2001 | |
| WO | WO 01/33367 | 5/2001 | |
| WO | WO 01/33368 | 5/2001 | |
| WO | WO 01/52045 | 7/2001 | |
| WO | WO 01/52046 | 7/2001 | |
| WO | WO 01/52047 | 7/2001 | |

OTHER PUBLICATIONS

Uw, "Setup and Configuration Screens", University of Washington, Jan. 29, 1998, 2 pages.*

Uw, "Pine: Email for Unix", University of Washington, Apr. 14, 1998, 8 pages.*

Veizades et al., "Service Location Protocol", Jun. 1997, Sun Microsystems, RFC 2165, 72 pages.*

English-language version of Japanese Office Action.

* cited by examiner

| ADDRESS | DOMAIN | COLOR | SCREEN | MAXIMUM SHEET SIZE | MINIMUM SHEET SIZE | LOCATION |
|---|---|---|---|---|---|---|
| PRINTER 1 | minato.printservice.com | YES | YES | A3 | A5 | Roppongi, Minato-ku |
| PRINTER 2 | minato.printservice.com | YES | YES | A3 | A6 | Akasaka, Minato-ku |
| PRINTER 3 | kawasaki.printservice.com | YES | YES | A3 | B5 | Mizonokuchi, Takatsu-ku, Kawasaki-shi |
| PRINTER 4 | ebina.printservice.com | NO | YES | A3 | A5 | Chuo, Ebina-shi |
| PRINTER 5 | ebina.printservice.com | NO | YES | A3 | A5 | Hongo, Ebina-shi |

Fig. 3

PAYMENT BASED ELECTRONIC MAIL PRINTING SYSTEM UTILIZING SEARCH CRITERIA

BACKGROUND OF THE INVENTION

1. Field of the Invention

The present invention relates to an information output system in which electronic mail is utilized, and particularly, it relates to a system for receiving electronic mail from a terminal apparatus and outputting (particularly, printing) information included in the electronic mail.

2. Description of the Related Art

At present, electronic mail is broadly utilized as a communication tool. With respect to the transmission/reception of electronic mail, a transmitter and a receiver generally utilize a personal computer (PC). In recent years, many apparatuses such as cellular phones, personal digital assistants (PDA) and notebook-size PC's are provided with an electronic mail transmission/reception function. Such a portable terminal apparatus can also be utilized to perform the transmission/reception of electronic mail.

A memory capacity in the above portable terminal apparatus is not so large, and there is a restriction on a browsing system and application software which can be mounted on the terminal apparatus. Therefore, the reception of the electronic mail and the browsing of text are possible, but it is impossible to browse a file or data attached to the electronic mail in some cases, and it is also impossible to browse text constituted of a long sentence in other cases. Furthermore, the terminal apparatus is usually provided with no printer. Therefore, the attached file or data can be browsed on a screen, but it cannot be printed. Therefore, in the related art, it has been necessary to improve the function of the terminal apparatus, or to transfer the received electronic mail to a PC system in a home or an office. In the former case, however, the constitution of the terminal apparatus is complicated, and in the latter case, prompt communication is inhibited.

On the other hand, in a print center, and the like, a print service is presented to an unspecified number of the general public. A person who utilizes the print service transmits print information to the print center via a network. Thereby, the printing of the print information is executed in the print center. However, in order for a user to easily utilize this service, there is a room for improvement in the system. In the print center, usually, on a condition that a fee has been paid, printed matter already printed and stored is handed over to an owner. However, the printing is actually executed at a stage in which the payment is not secured, and therefore a problem arises that a print cost associated with expendable supplies cannot be collected in a case in which the owner does not come to take the printed matter or in other cases. Moreover, it is also troublesome for the service user to pay the fee every time one printed matter is received, and a rational settlement system has been demanded. Furthermore, it is necessary to cope with computer viruses which has raised a problem in recent years.

Disclosed in Japanese Patent Application Laid-Open No. 191453/1998 is a system for utilizing a telephone line to transfer the print information to a printer of a store (e.g., a gas station) from an information processor mounted in a car, so that the printer prints the print information. In the system, a candidate for the printer for executing the printing is searched for in accordance with a car position. However, in this system, an appropriate printer is not determined as the candidate in accordance with properties of the print information. For example, even with presence of a color printer which can print a color image, there is always the possibility that the nearest monochromatic printer will be determined as the candidate. Moreover, in this system, it is presumed that the printing is executed after transfer of the print information, and a charging processing is performed during delivery of the printed matter, but a case in which the owner of the printed matter fails to come to take the printed matter is not considered. Furthermore, it is presumed that an exclusive protocol or the like needs to be developed to realize the aforementioned service, but effective utilization of the existing communication tool is not considered.

Disclosed in Japanese Patent Application Laid-Open No. 146118/1999 is a system for performing user authentication when the print service is performed. Moreover, as a print charging mode, selection of credit card settlement, drawing from a bank account, or cash on delivery is also disclosed. However, also in this system, effective utilization of existing communication tools is not considered. Additionally, since the charging is performed after the printing of the print information, the aforementioned problem similarly occurs. Moreover, suitability of the printer for the print information is not judged.

Disclosed in Japanese Patent Application Laid-Open No. 77994/1994 is a system for utilizing electronic mail to transfer the print information to the print service center. Since an electronic mail system broadly spread at present is utilized, compared with the aforementioned two conventional systems, the system is satisfactory in user operability, and advantageous in system spreading and extending properties. However, since a constitution for integrally managing a plurality of printers to judge an appropriate printer is not used, there is a disadvantage in respect of the service. Particularly, it is impossible to select a proper print destination in consideration of the properties of the print information. Furthermore, charging is important in performing the print service, but no concrete constitution is disclosed in this respect.

Other than for the aforementioned documents, examples of the document in which the conventional art is disclosed include Japanese Patent Application Laid-Open Nos. 234464/1999, 322509/1998, 254982/1998, 27822/1997, 6005/1995, 240637/1998, 200367/1997, 191081/1999, 222527/1998, 63601/1998, 284847/1997, 288403/1999, and the like. However, the systems described in the respective documents cannot sufficiently achieve the following object of the present invention.

Additionally, in the above description, the related art has been described mainly with respect to print output, but additionally there are various information output systems such as screen display, sound output and dynamic image regeneration. With these situations, the aforementioned problems similarly exist. Moreover, the aforementioned respective problems similarly exist not only in a case in which the information is outputted from the portable terminal apparatus, but also in a case in which the information is outputted from a fixedly installed terminal apparatus (PC, and the like).

SUMMARY OF THE INVENTION

The present invention has been developed in consideration of the aforementioned conventional problems, and as an object thereof, an appropriate information output apparatus can be selected with respect to an output of information from a terminal apparatus.

Another object of the present invention is to utilize the existing communication tool so that information transmission can be performed.

As a further object of the present invention, when an information output service is performed, payment for the service can be collected under a rational charging system.

(1) To achieve the aforementioned objects, according to the present invention, there is provided a system including: a managing section for managing a mail address for each output apparatus; a search section for searching an output apparatus group for one candidate output apparatus or a plurality of candidate output apparatuses in response to a search request from a terminal apparatus; a notifying section for notifying the terminal apparatus of the mail address of the one candidate output apparatus or the plurality of candidate output apparatuses; and a distinguishing section for distinguishing a designated output apparatus from the output apparatus group based on a destination mail address of an electronic mail issued from the terminal apparatus, and the designated output apparatus outputs information included in the electronic mail issued from the terminal apparatus.

According to the aforementioned constitution, when the information output is necessary in the terminal apparatus, the terminal apparatus issues the search request. In response to the search request, the output apparatus group registered beforehand is searched for the one candidate output apparatus or the plurality of candidate output apparatuses. As a result, the terminal apparatus is notified of the electronic mail address of the one candidate apparatus or the plurality of candidate apparatuses. In the terminal apparatus, the notified candidate output apparatus is specified as the designated output apparatus, or the designated output apparatus is selected from the plurality of notified candidate apparatuses. Moreover, the electronic mail address of the designated output apparatus is utilized as a destination, and the electronic mail for information output is issued from the terminal apparatus. When the distinguishing section receives the electronic mail, the destination mail address described in the electronic mail is referred to, and the designated output apparatus is distinguished in accordance with the destination mail address. Furthermore, the designated output apparatus outputs the information included in the electronic mail.

The terminal apparatus is preferably a portable terminal apparatus, and examples thereof include a cellular phone, PDA, notebook-size PC, and other various apparatuses provided with an electronic mail transmission/reception function. The terminal apparatus may also be a fixedly installed PC. Examples of the information outputted by the output apparatus include text data, diagram data, static image, dynamic image data, sound data, and the like. The output apparatus is preferably disposed in accordance with a type of information to be outputted. The output apparatus is, for example, a printer, an image display, a facsimile apparatus, an image regeneration apparatus, a sound regeneration apparatus, or the like. These plurality of types of apparatuses may be included in the output apparatus group. The information to be outputted may be, for example, a file attached to the electronic mail received by the terminal apparatus, an electronic mail text, and the like. When such information is included in the electronic mail and transmitted, a transfer function of an electronic mail server may be utilized. Specifically, in the electronic mail server, the information to be outputted is inserted in or attached to the electronic mail issued from the terminal apparatus.

The managing section, search section, notifying section and distinguishing section may be constituted by separate information processors, but may integrally be constituted by a single information processor.

Additionally, to transmit/receive the electronic mail, it is preferable to perform encryption during transmission, and perform decipherment (decryption) during reception. As a technique for this, various known techniques can be utilized.

(2) In the system of the present invention, preferably, the managing section further manages performance information for each output apparatus, and the search section searches for the one candidate output apparatus or the plurality of candidate output apparatuses based on the performance information. Moreover, preferably, the managing section further manages installation position information for each of the output apparatuses, and the search section searches for the one candidate output apparatus or the plurality of candidate output apparatuses based on the installation position information.

The performance information and installation position information regarding the output apparatus are utilized during setting of a search condition in order to search for one candidate output apparatus or the plurality of candidate output apparatuses, for example, in accordance with a content, type, data amount, output condition, and the like of the information to be outputted. For example, in consideration of the installation position of the output apparatus, the nearest output apparatus can be determined as the candidate output apparatus. By combination of various search conditions, at least one appropriate candidate output apparatus is selected.

The system of the present invention preferably includes an accounting processor for executing accounting processing before outputting the information to be outputted. The output apparatus is installed, for example, in an output service center, and the accounting processor is utilized when an output service is performed in a charged manner. In this case, by performing the accounting processing before outputting the information, specifically, by prohibiting the information from being outputted until completion of the accounting processing, it is possible to avoid problems in a case in which no fee is paid regardless of the completion of the information output, such as output cost, output burden, and apparatus wear.

(3) Moreover, in order to achieve the aforementioned objects, according to the present invention, there is provided a system including: a printer group consisting of a plurality of printers; a first server provided with an address managing section for managing a mail address for each of the printers, a search section for searching the printer group for one candidate printer or a plurality of candidate printers in response to a search request from a client (client machine), and an address notifying section for notifying the client of the mail address of the one candidate printer or the plurality of candidate printers; and a second server provided with a receiving section for receiving an electronic mail issued by the client, a distinguishing section for distinguishing a designated printer from the printer group based on a destination mail address of the electronic mail, and a converting section for converting information included in the electronic mail in accordance with the designated printer, and the designated printer prints the converted information.

According to the aforementioned constitution, after searching for the one candidate printer or the plurality of candidate printers (candidate output apparatuses) in response to the search request from the client, the client is notified of the mail address of the one candidate printer or the plurality of candidate printers. The client utilizes the address to prepare the electronic mail for information output with designation of the designated printer, and transmits the mail. By referring to the destination mail address of the electronic mail, the designated printer for performing the printing of the information (information to be outputted) included in the electronic mail is distinguished. Additionally, prior to the printing, the converting section converts the information included in the electronic mail. Preferably, the information is converted to a page description language (PDL) file.

When only one candidate printer is searched in the constitution, the printer may be automatically or manually selected as the designated printer. When a plurality of candidate printers (or identifiers) are displayed on a screen on a client side, a list display form is preferably employed. As a page description language (PDL), various general-purpose or special-purpose languages can be used. Of course, the printing can be performed without performing such PDL conversion, and the PDL conversion becomes unnecessary in a case where the PDL file is transferred from the first instance.

Preferably, the first server further includes an information managing section for managing the performance information and installation position information for each of the printers, and an information notifying section for notifying the client of at least one of the performance information and the installation position information of the candidate printer.

According to the aforementioned constitution, since the performance information (function, specification, operation situation, and the like) or the installation position information on the respective candidate printers can be referred to or utilized on the terminal apparatus, it is possible to automatically select or for the user to select a most suitable designated printer.

Preferably, electronic mail is utilized to perform communication between the client and the first server. Additionally, a communication method other than electronic mail may be utilized to establish the communication between both. For example, by opening a WEB page on the first server, and using the page as a user interface, the candidate printer may be selected.

Preferably, the system includes an authentication apparatus for performing user authentication prior to print processing of the converted information in the designated printer. As a result, the print processing is performed after it is judged that the user is authorized, so that an unauthorized user is prevented from obtaining printed matter, it and printing waste in this case is prevented.

Preferably, the second server further includes a separating section for separating the electronic mail into a plurality of mail elements, and an individual managing section for individually managing the respective mail elements, and the information to be printed corresponds to one mail element.

According to the aforementioned constitution, since the electronic mail is managed in a state of the plurality of separated mail elements, the mail elements can be advantageously processed individually.

Preferably, the second server further includes a storing section in which the information constituting the electronic mail is stored, a monitor section for monitoring empty capacity of the storing section, and a restricting section for restricting reception of a print request in accordance with the empty capacity of the storing section.

According to the aforementioned constitution, the empty capacity of the storing section in which the electronic mail itself or the PDL file is stored becomes zero or very little, the reception of print requests is then restricted, and data stored in the storing section can be protected.

Preferably, the second server further includes a restriction notifying section for notifying the client of reception restriction when the reception of the print request is restricted. According to the constitution, it can be judged on the client side whether or not the printing is possible, and a problem that the issued print request is not processed, or another problem, can be prevented beforehand. When the storing section (storing area) exists for each printer, the reception restriction of print requests may be performed for each printer, or the client may be notified of information indicating that the reception is possible/impossible for each printer.

Preferably, the system includes a storing section for storing the PDL file, and a deleting section for deleting the stored PDL file when a predetermined condition is satisfied. The deleting of the PDL file is usually performed after completion of the printing of the PDL file, but the PDL file may be stored for a fixed period in consideration of reprinting or the like. Moreover, the deleting can be performed automatically, or performed manually operation of a system manager or the user.

Preferably, the second server further includes a virus processing section for performing a virus check on the electronic mail. In recent years, the spread of electronic computer viruses using the medium of electronic mail has been regarded as a problem, but by performing the check before the printing, the system can be protected from viruses. It is general to discard the electronic mail infected by the virus, but the electronic mail may be processed after removing the virus.

Preferably, the virus processing section includes a report preparing section for preparing a virus check report when it is judged by the virus check that the virus is present, and a report print control section for performing a control to print the virus check report instead of the printing of the information included in the electronic mail in the designated printer when the presence of a virus is determined. According to the constitution, by issuing the virus check report, the user can be informed of the presence of a virus.

Preferably, the system includes an accounting processing section for performing accounting processing prior to the printing of the virus check report. The virus check is performed utilizing a system resource, and this is reflected when charging is performed. Thereby, abuse of the system by issuing the print request for a purpose of the virus check can be eliminated.

(4) Moreover, to achieve the aforementioned objects, the present invention includes a managing section for managing a mail address for each output apparatus, a search section for searching an output apparatus group for one candidate output apparatus or a plurality of candidate output apparatuses in response to a search request from a terminal apparatus, a notifying section for notifying the terminal apparatus of the mail address of the one candidate output apparatus or the plurality of candidate output apparatuses, a distinguishing section for distinguishing a designated output apparatus from the output apparatus group based on a destination mail address of an electronic mail issued from the terminal apparatus, and a charging processor for performing a charging processing prior to outputting of information included in the electronic mail, and allowing the designated output apparatus to output the information included in the electronic mail after the charging processing.

According to the aforementioned constitution, the information can actually be outputted after the accounting processing is completed, and this can prevent a problem where the output is completed but the user pays no fee and a resource utilization fee cannot be collected.

Preferably, the accounting processor includes a selecting section for allowing the user to select an accounting system, and an accounting executing section for performing accounting in accordance with the selected accounting system. Examples of the accounting system include cash collection, fee collection utilizing a prepaid card, settlement utilizing a credit card, settlement utilizing a bank account for an individual or a company, settlement utilizing another external settlement mechanism, and the like.

(5) Moreover, in order to achieve the aforementioned objects, according to the present invention, there is provided a method comprising steps of: managing a mail address for each output apparatus; searching an output apparatus group for one candidate output apparatus or a plurality of candidate output apparatuses in response to a search request from a terminal apparatus; notifying the terminal apparatus of the mail address of the one candidate output apparatus or the plurality of candidate output apparatuses; distinguishing a designated output apparatus from the output apparatus group based on a destination mail address of an electronic mail issued from the terminal apparatus; and outputting information included in the electronic mail issued from the terminal apparatus by the designated output apparatus.

In the aforementioned constitution, the respective steps can be realized on a single computer, but the respective steps may be performed by using a plurality of computers in a combined manner.

(6) Moreover, in order to achieve the aforementioned objects, a recording medium of the present invention is a storage medium in which a program to be executed on a computer is stored, and the program includes a module for managing a mail address for each output apparatus, a module for searching an output apparatus group for one candidate output apparatus or a plurality of candidate output apparatuses in response to a search request from the terminal apparatus, a module for notifying the terminal apparatus of the mail address of the candidate output apparatus, and a module for distinguishing a designated output apparatus from the output apparatus group based on a destination mail address of an electronic mail issued from the terminal apparatus.

In the aforementioned constitution, the program is stored in the computer, or read in. A concept of the medium includes all transportable recording mediums, and additionally includes fixed recording mediums such as ROM and hard disk. Moreover, transmission of the program via a network is one mode for carrying out the present invention.

(7) Moreover, in order to achieve the aforementioned objects, according to the present invention, there is provided a system including: an output apparatus group consisting of a plurality of output apparatuses; a transportable terminal apparatus provided with an electronic mail transmission/reception function; a first mail server for presenting an electronic mail transmission/reception service to the terminal apparatus; a first management server provided with a managing section for managing a mail address for each of the output apparatuses, a search section for searching the output apparatus group for one candidate output apparatus or a plurality of candidate output apparatuses in response to a search request from the terminal apparatus, and a notifying section for notifying the terminal apparatus of the mail address of the candidate output apparatus; a second mail server for receiving an electronic mail issued from the terminal apparatus; and a second management server provided with means for distinguishing a designated output apparatus from the output apparatus group based on a destination mail address of the received electronic mail, and means for presenting information included in the electronic mail to the designated output apparatus.

The system is preferably constructed on networks such as Internet and LAN, and particularly the existing electronic mail system seen from a terminal apparatus side can be utilized as it is, which provides an advantage that the system is satisfactory in a general-purpose property and an extending property.

BRIEF DESCRIPTION OF THE DRAWINGS

FIG. 3 is a diagram showing content of an output destination management table of the output destination management server.

DETAILED DESCRIPTION OF THE PREFERRED EMBODIMENTS

A preferred embodiment of the present invention will be described hereinafter with reference to the drawings.

Figure 1:
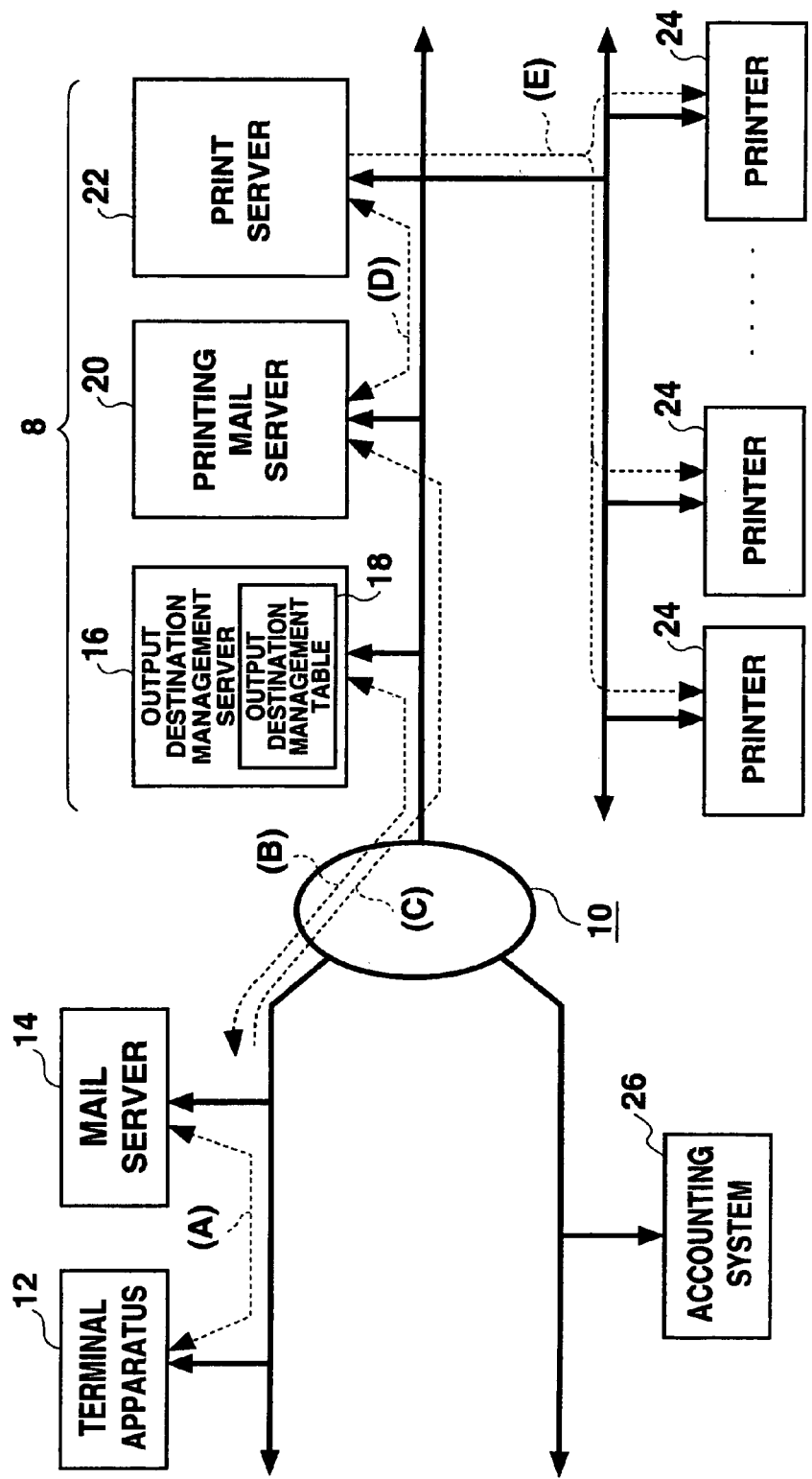
FIG. 1 is a block diagram showing the overall constitution of a print system according to the present invention.

FIG. 1 shows the preferred embodiment of a system according to the present invention. Specifically, FIG. 1 shows an electronic mail utilizing network print system 8 connected to a network 10. This print system 8 is a system for receiving electronic mail transmitted from a terminal apparatus 12 to perform the printing of information included in the mail (information to be printed). FIG. 1 shows the print system as the embodiment of the present invention, but the present invention can be applied to various information outputting systems. Additionally, the network 10 is constituted as an aggregate of a plurality of sub-networks including Internet. One or some of the sub-networks may utilize radio communication. Additionally, functions of respective apparatuses on the print system 8 are substantially realized by executing a program, and this program is stored on a memory in each apparatus.

In FIG. 1, the network 10 is connected to the terminal apparatus 12 and a mail server 14. In this embodiment, the terminal apparatus 12 is a cellular phone, PDA, notebook-size PC or another portable apparatus provided with an electronic mail transmission/reception function. Of course, the apparatus may be a fixedly installed PC. The mail server 14 is a known server for offering an electronic mail service, and offers electronic mail transmission and reception services to the terminal apparatus 12. Specifically, the mail server 14 is provided with a function of relaying the electronic mail for the terminal apparatus 12 from the outside to distribute the electronic mail to the terminal apparatus 12, and a function of relaying the electronic mail issued for another apparatus from the terminal apparatus 12 to distribute the mail to the apparatus.

According to the aforementioned constitution, the terminal apparatus 12 receives the electronic mail distributed from the mail server 14. In this case, the terminal apparatus 12 may issue a request to the mail server 14 to obtain a newly arrived mail, or the mail server 14 may automatically distribute the newly arrived mail to the terminal apparatus 12. When a data amount of the electronic mail is large, the electronic mail may be distributed to the terminal apparatus 12 in a divided manner in accordance with a storage capacity. When a plurality of electronic mails arrive, index information of the mails may be distributed to the terminal apparatus 12 in a list form. A flow of processing to obtain the electronic mail is shown by (A) in FIG. 1. In a display section (not shown) of the terminal apparatus 12, a subject, sender, transmission date, and the like are displayed for each distributed electronic mail in the list form.

The electronic mails received by the terminal apparatus 12 include a mail in which a text data amount is too large to be displayed, a mail in which much display time is required, a mail in which an attached file content cannot be displayed, a mail in which a content can be browsed but wants to be separately printed, and the like. In this case, the print system 8 described below is utilized.

The print system 8 constitutes an information output system. In the present embodiment, the print system 8 is constituted by an output destination management server 16, a printing mail server 20, a print server 22 and a plurality of printers 24.

The output destination management server 16 is provided with an output destination management table 18 which will be described later, and refers to the table 18 to search a candidate printer with respect to the terminal apparatus 12 and provide the terminal apparatus 12 with information such as a mail address. The printing mail server 20 is a server for receiving the electronic mail issued from the terminal apparatus 12. The print server 22 refers to a destination mail address included in header information in the received electronic mail, distinguishes a designated printer based on the address, further converts the information included in the electronic mail (information as a print object) to a PDL file, and supplies the file to the designated printer. Additionally, processing for distinguishing the designated printer from the destination mail address may be executed by the printing mail server 20. The printer 24 is constituted of a printer, a combined machine, a facsimile apparatus, or another image forming apparatus. Additionally, in the present invention, an output apparatus is not limited to these.

Usually, each print center is provided with one printer or a plurality of printers, and the print centers are scattered/installed in each region. In this case, the output destination management server 16, printing mail server 20, and print server 22 may be installed in a management center for integrating/managing a plurality of print centers, but may be disposed in a scattered manner. Alternatively, as described later, these may be integrally incorporated in any printer 24.

Figure 2:
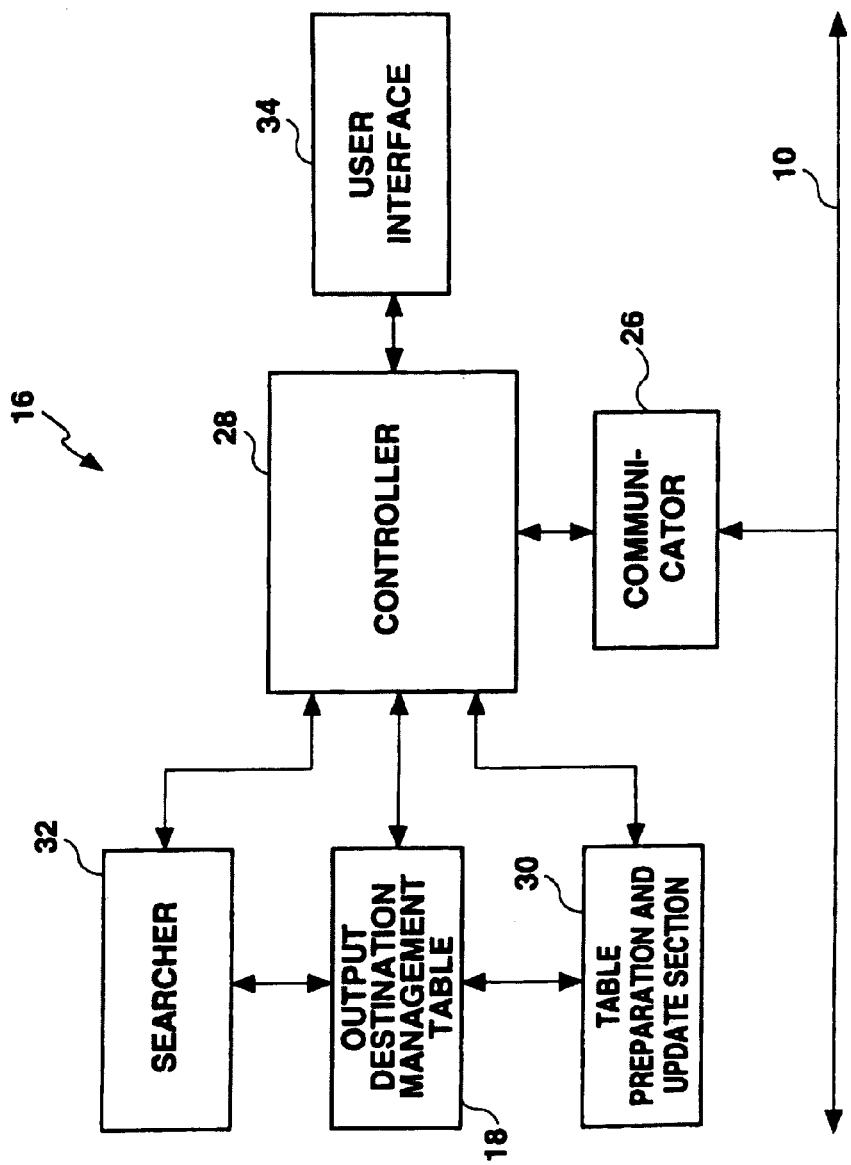
FIG. 2 is a block diagram showing a constitution of an output destination management server shown in FIG. 1.

FIG. 2 shows a structural example of the output destination management server 16. A controller 28 performs an operation control of each component of the output destination management server 16, and the controller 28 is connected to the network 10 via a communicator 26. For the output destination management table 18, as shown in FIG. 3, managed for each printer 24 are the information such as the mail address, domain, performance (presence/absence of a color print function, presence/absence of a double surface print function, sheet conditions such as maximum and minimum sheet sizes, and the like), and geographical position (location) where the printer is installed. A table preparation and update section 30 of FIG. 2 is provided with functions of preparing and updating the output destination management table. When a new printer 24 is added to the system 8, a record with respect to the printer 24 is added. Moreover, when the printer 24 is detached from the system 8, the corresponding record is deleted. Furthermore, when the specification of each printer 24 is changed, a change content is reflected in the output destination management table 18. A searcher 32 is provided with a function of searching one printer or a plurality of printers (candidate printers) 24 suitable for printing the information to be printed in accordance with a search condition when a search request including the search condition is received from the terminal apparatus 12. This respect will be described later in detail. A user interface 34 is constituted of a display section and an input section, so that a system manager performs maintenance of the output destination management server.

In FIGS. 1 and 2, the terminal apparatus 12 and output destination management server 16 are connected to each other on the network 10 utilizing the electronic mail, or utilizing other communication means (e.g., browsing of WEB page on WWW, and the like). This is shown by (B) in FIG. 1.

When a necessity of performing information output occurs in the terminal apparatus 12, first, the search request of the printer to output the information is issued to the output destination management server. In this case, the search conditions including the performance and installation position of the printer are added to the search request. For example, at least one of the search conditions "color print is possible", "double surface print is possible", "the printer is installed in Tokyo", "the printer is within a certain distance from a present location of the terminal apparatus", and the like is added. Of course, by successively designating a plurality of search conditions, the candidate printer may be limited in a stepwise manner. The search condition may be selected or inputted by a user on the terminal apparatus 12, or may be automatically set in accordance with properties of the information to be printed.

On the other hand, in the output destination management server 16 having received the search request, the searcher 32 searches the printer (or print center) as a candidate in accordance with the aforementioned search condition included in the search request. Subsequently, on specifying one or a plurality of candidate printers as a search result, the information on the candidate printer is transmitted to the terminal apparatus 12 as a search requester. In this case, for the sake of convenience of limiting/selecting by the user, along with the mail address, the performance, location, and other information are preferably transmitted together.

In the present embodiment, the output destination management server 16 monitors an operation situation or a job processing situation of each printer 24, and such status information can be included during transmission of information to the terminal apparatus 12. With the status information, the user can exclude a printer congested due to the job processing from selection, and ascertain that a printer is in a discontinued operation state, so that any printer can be designated. Of course, in the aforementioned search, in consideration of the status information, a printer that is unsuitable for performing print processing may be excluded from being a candidate.

Moreover, charging estimation information on a fee per page and output of the information to be printed may be transmitted together. Furthermore, a notice may be given to the effect that a large amount of the information to be printed is accumulated in the system as described later and this makes it difficult to receive a new print request, or that such reception restriction occurs with each printer.

As described above, by presenting various information with respect to the candidate printer in addition to the mail address of the candidate printer, when the user selects the printer in the terminal apparatus 12, the selection can be performed more appropriately, and rational system operating can be expected.

Additionally, when a large number of candidate printers are searched, it is preferable to group the printers in fixed units and perform transmission to the terminal apparatus 12 for each group. In this case, a transmission unit may be adjusted in accordance with a usable memory capacity of the terminal apparatus.

Furthermore, in the terminal apparatus 12 having obtained the information on the candidate printer from the output destination management server 16, a list of candidate printers is displayed. The list includes information such as an identifier, mail address, domain, performance, location, operation situation, and utilization fee of the candidate printer as occasion demands. Therefore, the user refers to such information to designate (select) the printer to which a print request is actually issued. Of course, by further setting the search condition as described above, the search may be performed again. Moreover, by automating the designation based on the information to be outputted, a selection result may be confirmed by the user. The information of the designated printer is stored in a memory of the terminal apparatus 12, and the printer to which the print request has been issued can preferably be confirmed later as occasion demands in the constitution. Usually, since the transmitted mail is stored in the mail system, by checking the record, the issuance destination of the print request issued by oneself can easily be confirmed. Additionally, when the past search result can be utilized to designate the printer on the terminal apparatus 12, the aforementioned search can be omitted.

As described above, after any printer is designated from a printer group in the terminal apparatus 12, the terminal apparatus 12 issues the electronic mail including the information to be printed to the printer 24. This is shown by (C) in FIG. 1. The electronic mail is, for example, an electronic mail (newly prepared mail) including information newly prepared on the terminal apparatus 12, or a received but transferred electronic mail (transferred mail) including information which cannot be utilized or referred to. When the latter electronic mail is transferred, in general, except for addition of predetermined information, the received electronic mail is transferred as it is without performing any special operation on the electronic mail. Here, predetermined information to be added includes print attributes (double surface print, number of print sheets, sheet size, and the like) and other conditions associated with image formation, the mail address of the terminal apparatus 12, user's information, and the like. But predetermined information is not limited to these information. As described above, when deletion or processing of the information in the electronic mail, file name change, or the like fails to be performed, identity of the information received by the terminal apparatus 12 can be held. Of course, the processing of the information can be allowed as occasion demands.

Additionally, in addition to issuance of the electronic mail directly from the terminal apparatus 12, the terminal apparatus 12 sends an issuance request of the electronic mail to the mail server 14, so that the mail server may issue the electronic mail. Particularly, when a size of an attachment file of the electronic mail distributed to the terminal apparatus 12 is large and the file is stored in the mail server 14, or when the file is stored on another apparatus, such a file is attached to the electronic mail on the mail server 14, and preferably transmitted to the print system 8 in the constitution. Besides, various electronic mail issuance systems can be employed.

The aforementioned electronic mail issued as the print request is obtained by the printing mail server 20 as shown by (C) in FIG. 1. Specifically, the mail address of each printer 24 constituting the print system 8 is registered in the printing mail server 20, and the electronic mail provided with the mail address of the printer 24 as a transmission destination is obtained. The printing mail server 20 essentially functions as a mail server exclusively for reception, but also functions as a mail server for transmission when transmission of the electronic mail or a predetermined notice to the terminal apparatus 12 from the print system 8 becomes necessary.

Additionally, with the transmission of the electronic mail from the terminal apparatus 12, the information included in the electronic mail is encrypted, and the printing mail server 20 or the print server 22 may decrypt the information. According to this constitution, system security can be enhanced.

The print server 22 functions as a printer control server, and performs communication with the printing mail server 20 as shown by (D) in FIG. 1. For example, the print server 22 periodically inquires of the printing mail server 20 about presence/absence of arrival of the new electronic mail, and executes a print control described later in detail when the new electronic mail arrives. Of course, on receiving the new electronic mail, the printing mail server 20 may spontaneously notify the print server 22 of the arrival, or automatically transfer the electronic mail to the print server 22.

Figure 4:
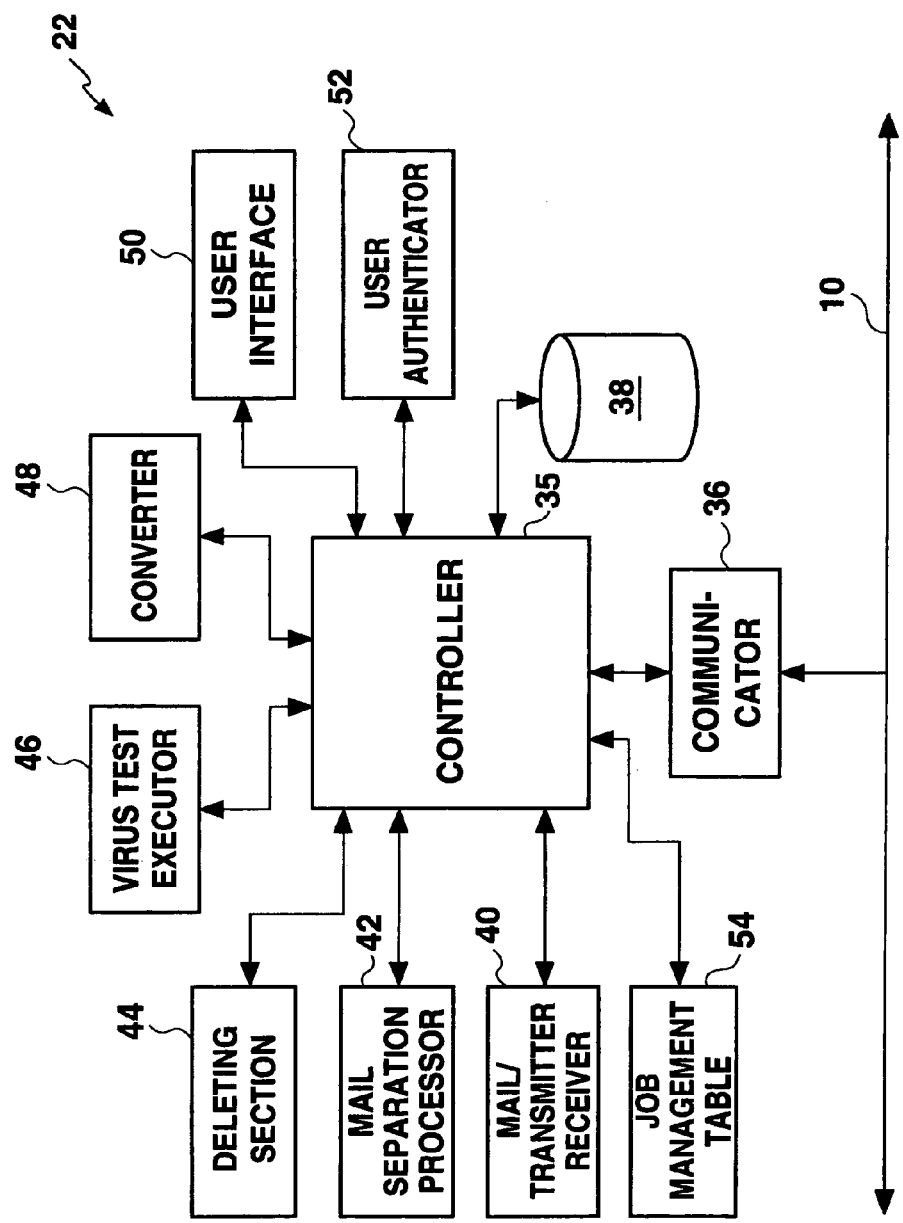
FIG. 4 is a block diagram showing a constitution of a print server shown in FIG. 1.

FIG. 4 shows a structural example of the print server 22. A controller 35 is connected to the network 10 via a communicator 36. The controller 35 performs communication with the printing mail server 20 or a plurality of printers 24 via the network 10. An external storage apparatus 38 is storage means for storing respective information constituting the obtained electronic mail, the PDL file described later, and various other information. A mail transmitter/receiver 40 is means for transmitting/receiving the electronic mail with the printing mail server 20. The mail transmitter/receiver 40 obtains the new electronic mail. Moreover, when the notice to the terminal apparatus 12 becomes necessary, the electronic mail issued by the mail transmitter/receiver 40 is transmitted to the terminal apparatus 12 via the printing mail server 20 and mail server 14 of FIG. 1. A mail separation processor 42 separates the received electronic mail for respective mail elements, and the respective mail elements are individually managed on the external storage apparatus 38.

This feature will be concretely described. The received electronic mail is separated into the additional information, mail text constituted of subject, text, and the like, and attached file, and these are individually managed. Additionally, by including information for specifying the information to be printed in the electronic mail and recognizing the information, the information to be printed may be specified, or as a default setting only the attached file or the entire electronic mail may be constantly regarded as the information to be printed.

The separation processing is performed for the sake of convenience in data handling, concretely, in order to reduce search time, memory consumption, and the like. For example, in a case in which a transmitter address is searched with respect to the electronic mail with a very large attached file size, a processing efficiency is better when the search object is set to the electronic mail text rather than to the entire electronic mail.

A virus test executor 46 is a module for checking for the presence/absence of electronic computer viruses with respect to the electronic mail. Before and after the separation processing, a virus test is executed, and only data in which the absence of viruses is conformed as a test result is stored in the external storage apparatus 38. This processing protects the system from computer viruses. On the other hand, electronic mail including viruses is generally discarded. Additionally, after removing viruses, the data may be stored.

A deleting section 44 is means for deleting the electronic mail or the PDL file described later from the external storage apparatus 38 when a predetermined deletion condition is satisfied. By appropriately deleting unnecessary information, a system storage capacity can be effectively utilized. Particularly, since a large amount of data such as a color image is probably handled, it is preferable to effectively perform the deletion processing.

A converter 48 is a module for converting the information to be printed (e.g., attached file data) to the PDL file. In this case, a type of page description language (PDL) is selected in accordance with the type and model of the designated printer, and the information to be printed is converted to description in the selected page description language. On the other hand, by referring to the destination mail address of the electronic mail, the designated printer is distinguished. This distinction processing is performed, for example, by the controller 35.

In the present embodiment, the electronic mail in which the presence of viruses is recognized by the virus test is discarded without being subjected to the PDL conversion processing. Instead, a report indicating a virus test result is prepared as the PDL file. This report includes information for specifying a type of virus, a place where the virus exists, and the like. As described later, by performing the virus test after completion of charging, or printing the virus test report after the completion of accounting, a resource utilization fee in the system can securely be collected.

In FIG. 4, a user interface 50 is constituted of a display section and input section, and utilized by a system manager in system maintenance or the like. Moreover, a user authenticator 52 includes a user database, and constitutes means for performing authentication with respect to the user when the printer 24 is actually allowed to perform printing as described later. The user authenticator 52 may be disposed in each printer 24.

As described above, in the print server 22, the information to be printed in the electronic mail is converted to the PDL file, and the file is temporarily stored in the external storage apparatus 38. Depending on the electronic mail, it is converted to plural PDL files. Additionally, conversion to the PDL file may be performed after the completion of accounting. Moreover, immediately after the conversion to the PDL file, the PDL file may be transferred to the designated printer. The transfer of the PDL file to the designated printer from the print server 22 is shown by (E) in FIG. 1.

Figure 5:
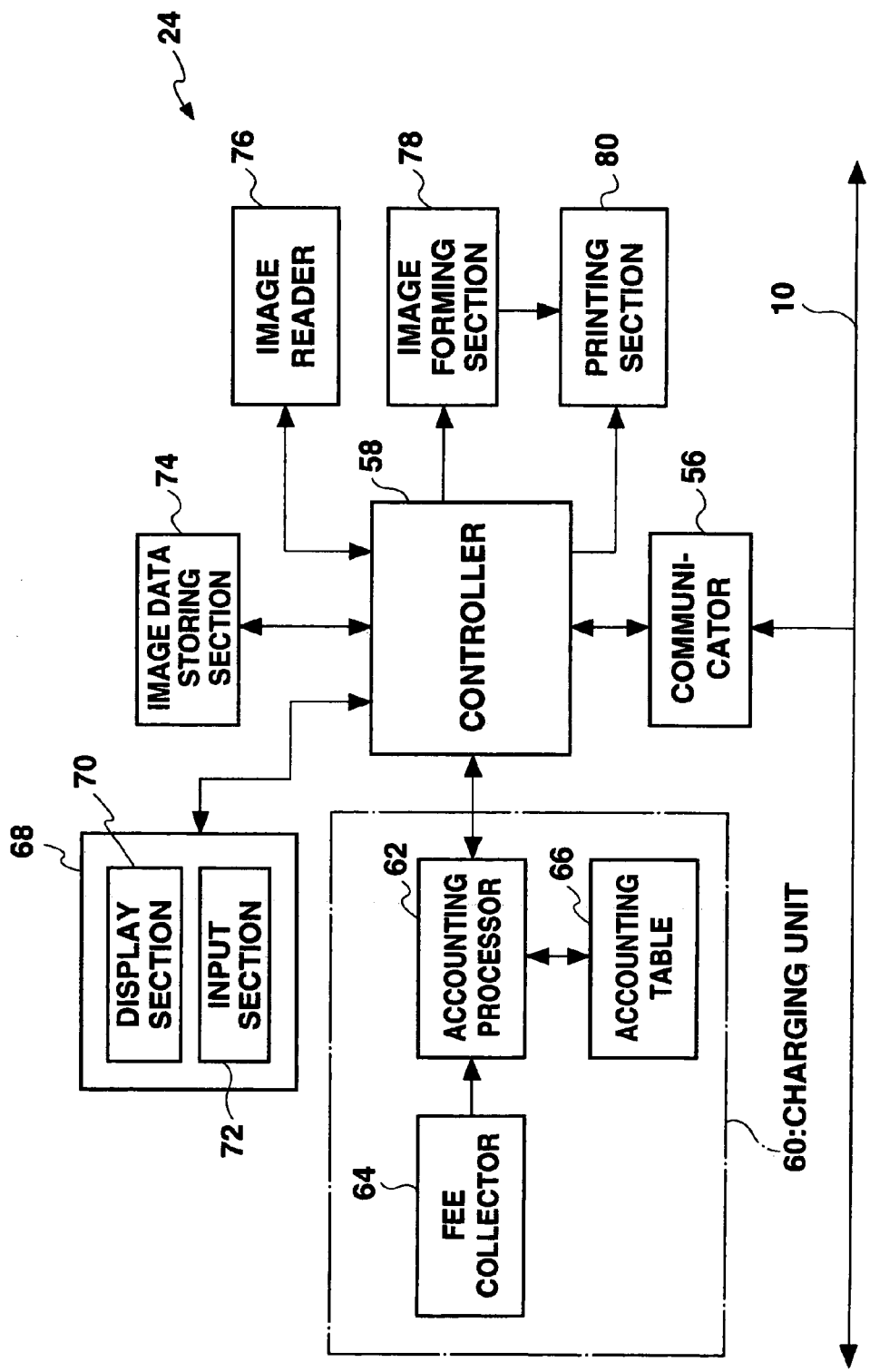
FIG. 5 is a block diagram showing a constitution of a printer shown in FIG. 1.

FIG. 5 shows a structural example of the printer 24. A controller 58 is connected to the print server 22 via a communicator 56 and network 10. In this case, the electronic mail may be utilized as a communication tool, an exclusive network may be utilized, or a general file transfer protocol may be utilized.

The controller 58 is connected to an image data storing section 74 as an external data storage apparatus. An image reader 76 is means for obtaining the PDL file from the print server 22, and the obtained PDL file is stored in the image data storing section 74. An image forming section 78 is means for interpreting a PDL file content to form an image of each page. The formed image is transferred onto a sheet by a printing section 80. A printing condition of this case is transferred from the print server 22 as described above. A user interface 68 is constituted of a display section 70 and an input section 72.

In the example shown in FIG. 5, the printer 24 is provided with an accounting unit 60. In the accounting unit 60, an accounting processor 62 is provided with a function of demanding agreement with accounting from the user before performing the actual printing of the information, and allowing the printing to be executed when the agreement is obtained and the accounting is completed, a function of calculating an accounting amount in accordance with the information to be printed and information size, and a function of allowing the user to select an accounting principle. An accounting table 66 stores a condition for the accounting processing, and stores an accounting result as occasion demands. A fee collector 64 is an apparatus for collecting cash.

When the information to be printed is allowed to be actually printed, the user operates the user interface 68, and inputs a print instruction with respect to the electronic mail transferred by oneself. In this case, the accounting processor 62 demands input of the user's own information. With agreement of the inputted own information with already registered information, that is, with a correct user, after the accounting processing is performed, the image is actually formed and printed as described above. The user authentication is actually executed by the user authenticator of FIG. 4, but each printer 24 may perform the processing. Additionally, when the user authentication fails to be performed, a message to this effect is displayed on the display section 70.

The print server 22 transmits the PDL file as the information to be printed and information of print attributes to the printer 24 as described above. In addition to these items of information, information for the user authentication may be transmitted when the printer 24 performs the user authentication. Transmission timing for each item of information can be appropriately set in accordance with a user authentication completion timing or an accounting processing completion timing. For example, the PDL file may be transferred to the printer 24 after the completion of the user authentication or the accounting processing, but prior to the completion the PDL file may also be transferred to the printer 24. Moreover, the PDL conversion processing may not be performed until the completion of the user authentication or the accounting processing. Furthermore, the attribute information is usually transferred together with the PDL file, but the former or the latter may be transmitted ahead of the other.

By referring to FIGS. 1 to 5 an operation of the print system 8 shown in FIG. 1 will next be described using a flowchart.

Figure 6:
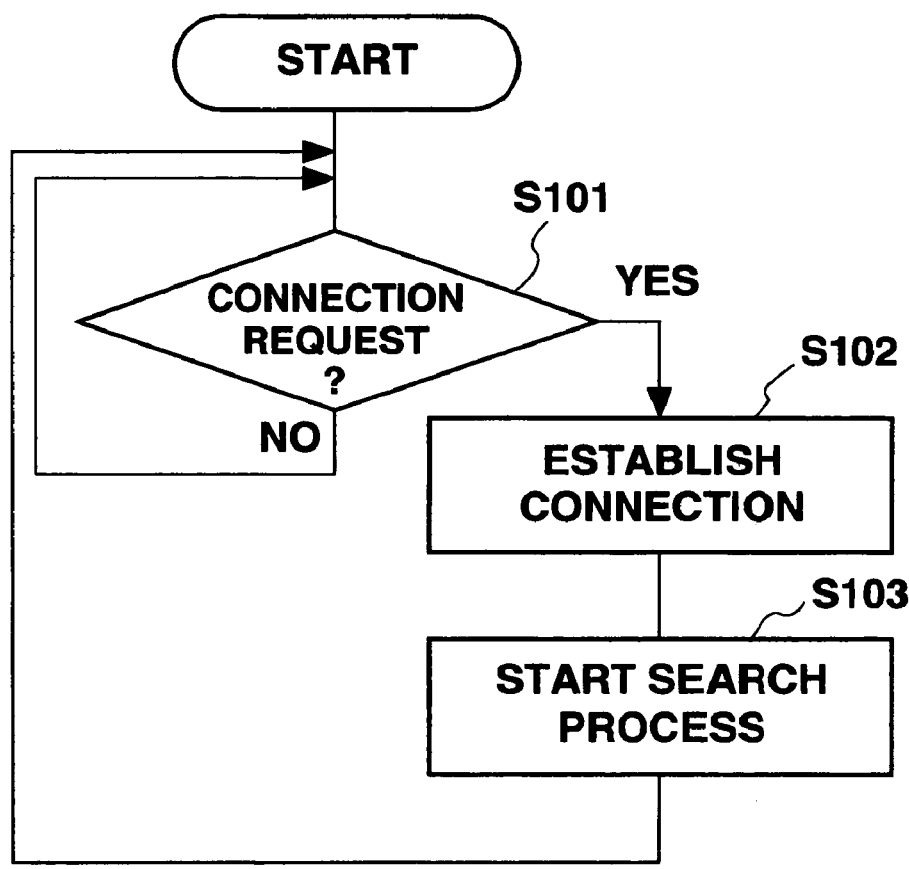
FIG. 6 is a flowchart showing a connecting operation of the output destination management server shown in FIG. 1.
Figure 7:
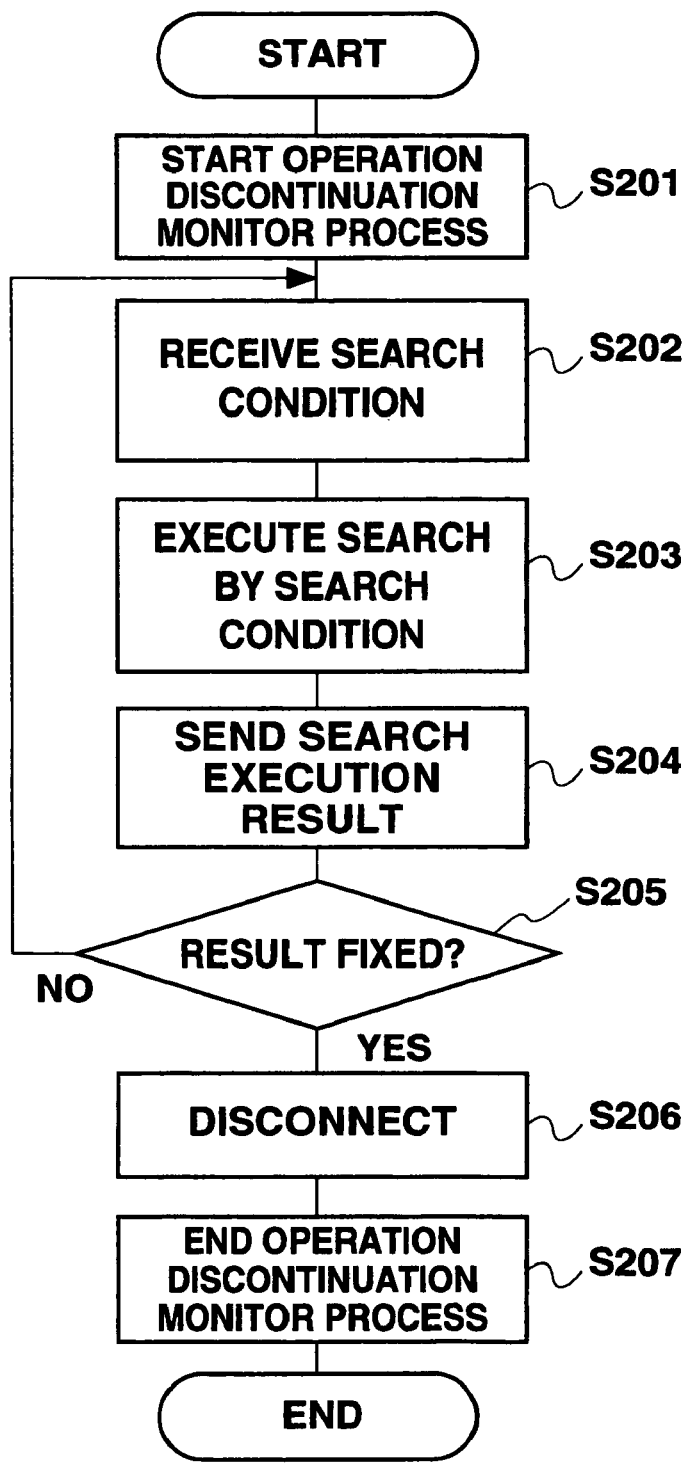
FIG. 7 is a flowchart showing a search operation of the output destination management server shown in FIG. 1.
Figure 8:
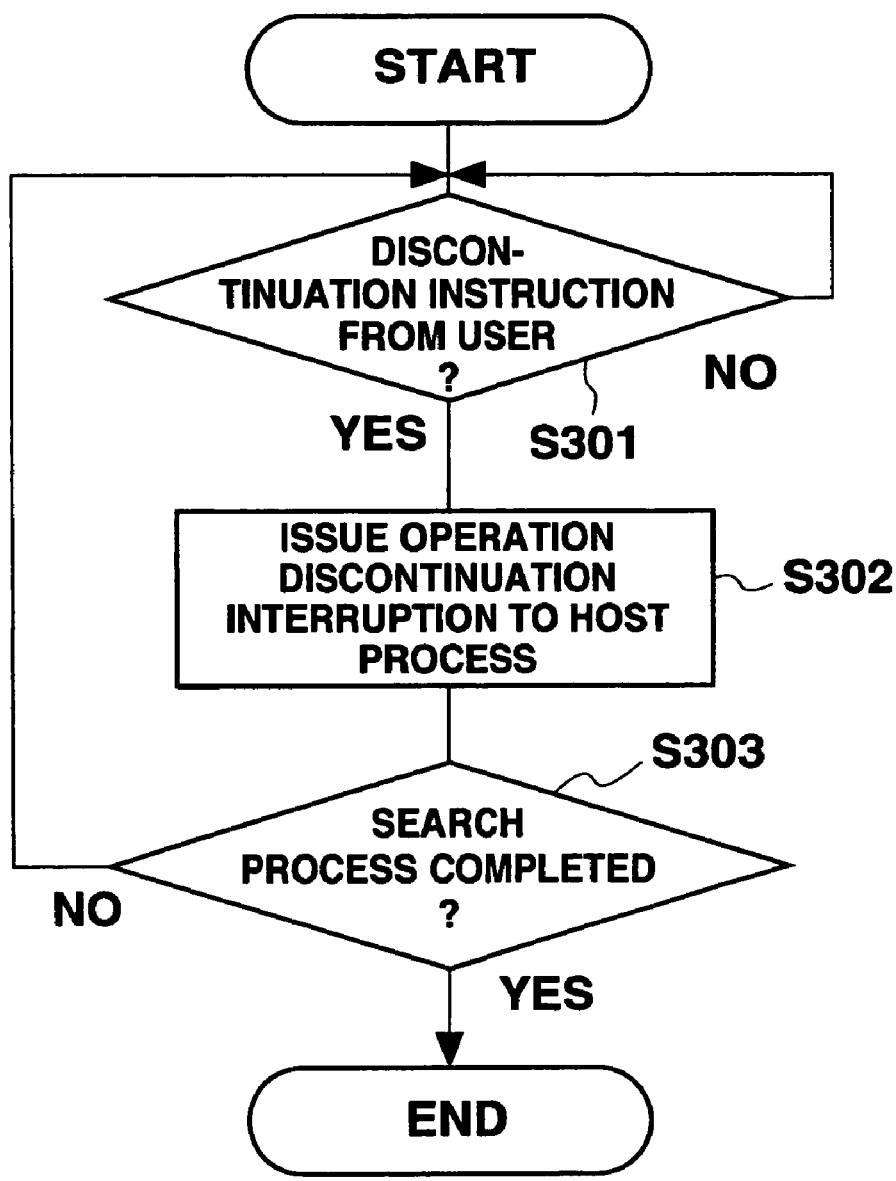
FIG. 8 is a flowchart showing an interrupting operation of the output destination management server shown in FIG. 1.

FIGS. 6 to 8 are flowcharts showing an operation example of the output destination management server 16 shown in FIG. 1. First, FIG. 6 shows a search process, and it is judged in S101 whether or not there is a connection request from the terminal apparatus 12. Here, when it is judged that there is such a connection request, connection of the output destination management server 16 to the terminal apparatus 12 is established in S102. This is shown by (B) in FIG. 1. In S103, the search process shown in FIG. 7 is started.

In the search process shown in FIG. 7, in S201, first an operation discontinuation monitor process is started as described later and shown in FIG. 8. In S202, the search condition included in the search request is received. Subsequently, in S203, the candidate printer is searched based on the search condition as described above. In S204, as a search execution result, information indicating one or a plurality of candidate printers is transmitted to the terminal apparatus 12 from the output destination management server 16. In S205, the presence or absence of a further search from the terminal apparatus 12 is judged, and respective steps from S202 are repeatedly executed when there is an additional search condition. In S206, the output destination management server 16 is disconnected from the terminal apparatus 12, and in S207 the operation discontinuation monitor process ends.

FIG. 8 shows the operation discontinuation monitor process. It is judged in S301 whether or not there is an instruction for discontinuation from the terminal apparatus 12, namely, the user, and when there is such a discontinuation instruction, in S302 interruption to the process shown in FIG. 7 for the operation discontinuation is issued. Subsequently, it is judged in S303 whether or not to complete the search process, and when the search process is not completed, an interruption state is continued until cancellation of the discontinuation instruction from the user. Moreover, to complete the search process, the search process and accompanying processes are all ended.

After the aforementioned respective processings are performed, the printer 24 which is allowed to print the information to be printed is designated in the terminal apparatus 12. Specifically, by using the mail address of the designated printer 24 as the destination, the electronic mail is prepared and issued. This electronic mail is received by the printing mail server 20 shown in FIG. 1.

Figure 9:
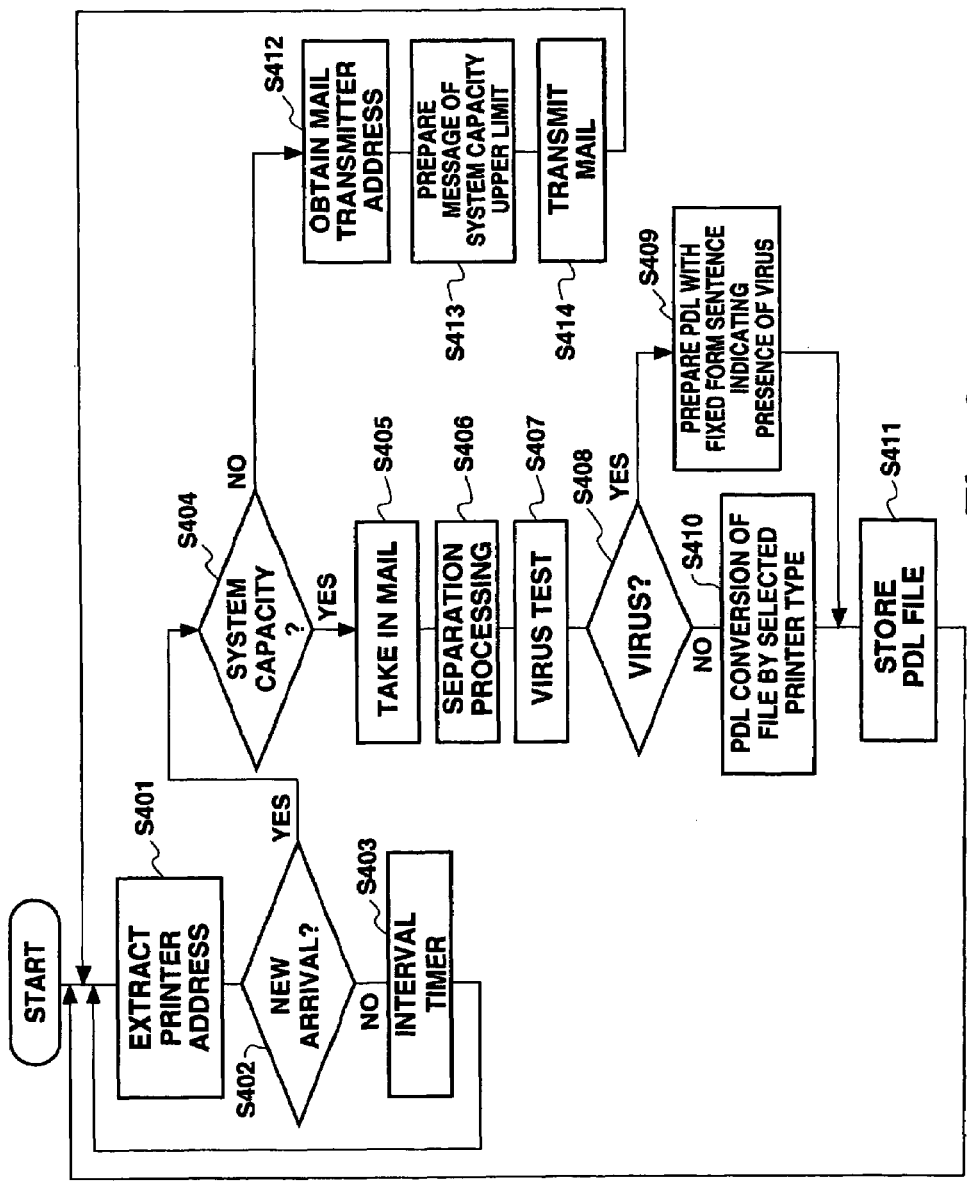
FIG. 9 is a flowchart showing an operation of the print server shown in FIG. 1.

FIG. 9 is a flowchart showing an operation example of the print server 22 shown in FIG. 1.

First, in S401, the mail addresses of the printers are extracted one by one in order from the printer group, and in S402 the print server 22 inquires of the printing mail server 20 about the presence or absence of arrival of the new electronic mail with respect to the mail address. Here, when there is no new arrival, in S403 an interval timer waits for elapse of a fixed time, again in S401 the next mail address is extracted, and the judgment of S402 is again executed. Subsequently, this is repeated. On the other hand, it is judged in S402 that there is the new arrival, and in S404 an empty capacity is determined with respect to the external storage apparatus (system capacity) 38 of the print server 22. Here, it is judged that the empty capacity is insufficient, then in S412 the mail address on the side of the transmitter having transmitted the electronic mail is extracted, and next in S413 an upper limit of the storage capacity is obtained and a message indicating that the print request cannot therefore be processed is prepared. In S414, the electronic mail including the message is prepared, and issued to the terminal apparatus 12 as a print requester. Subsequently, the respective steps from S401 are repeatedly executed.

On the other hand, it is judged in S404 that there exists a sufficient empty capacity for receiving the electronic mail, and then in S405 the electronic mail is taken into the print server 22 from the printing mail server 20. Subsequently, in S406 a processing of separating the information into the mail elements constituting the electronic mail is executed. In S407, a test is carried out to judge whether an electronic computer virus is present or absent with respect to the respective information as described above. In S408, when the presence of a virus is found as the test result, instead of conversion of the information as the print object to PDL, in S409 the PDL file with a fixed form sentence is prepared as the test report indicating the presence of a virus. On the other hand, when no virus exists, in S410 the processing of conversion to the PDL file is executed in accordance with the type of the selected (designated) printer. Subsequently, in S411, the PDL file prepared in S410 or S409 is stored prior to the transmission to the printer 24. As described above, the PDL file is transmitted to the printer in response to the request from the printer 24, or transmitted to the printer 24 before the request.

Figure 10:
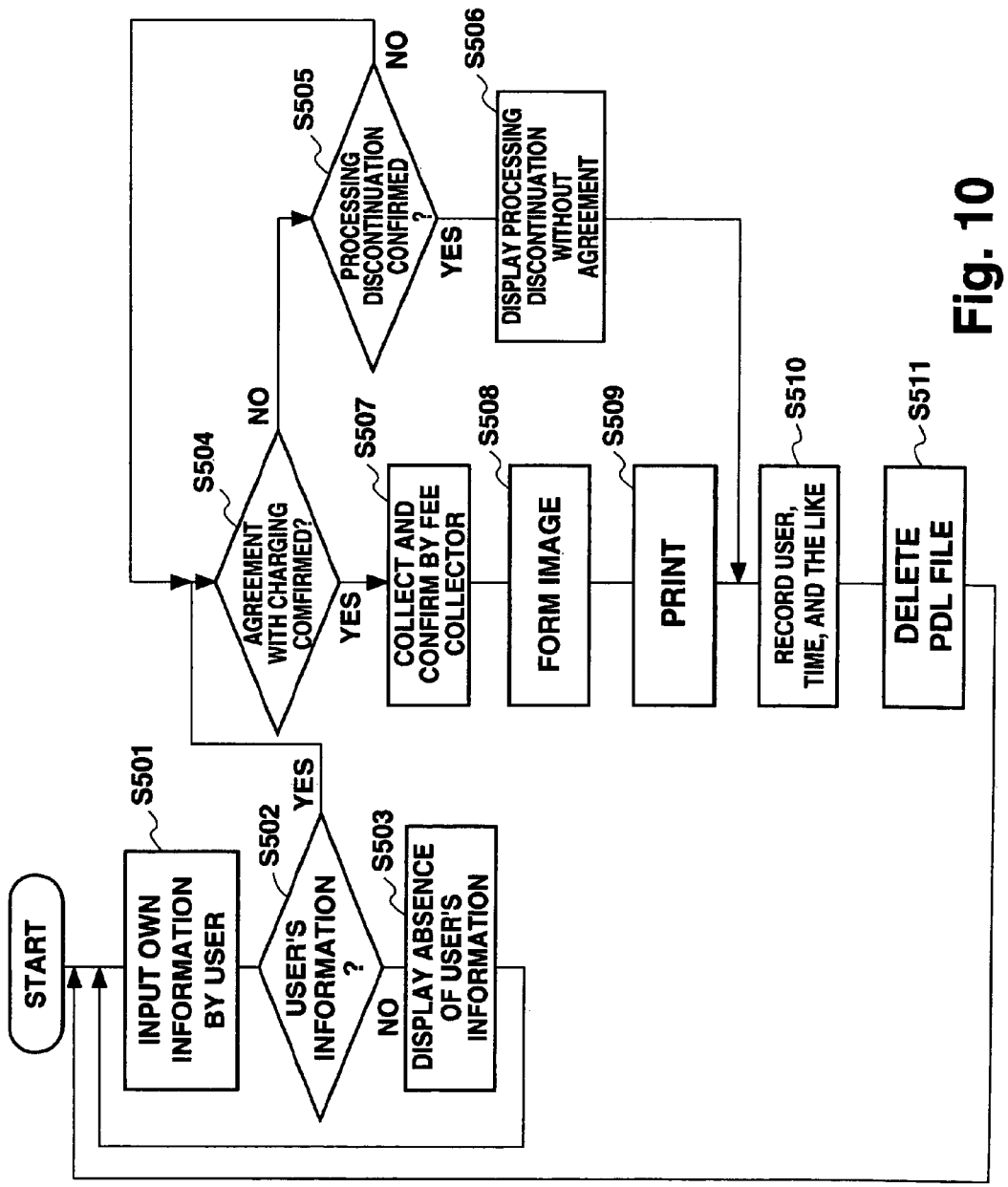
FIG. 10 is a flowchart showing an operation of the printer shown in FIG. 1.
Figure 11:
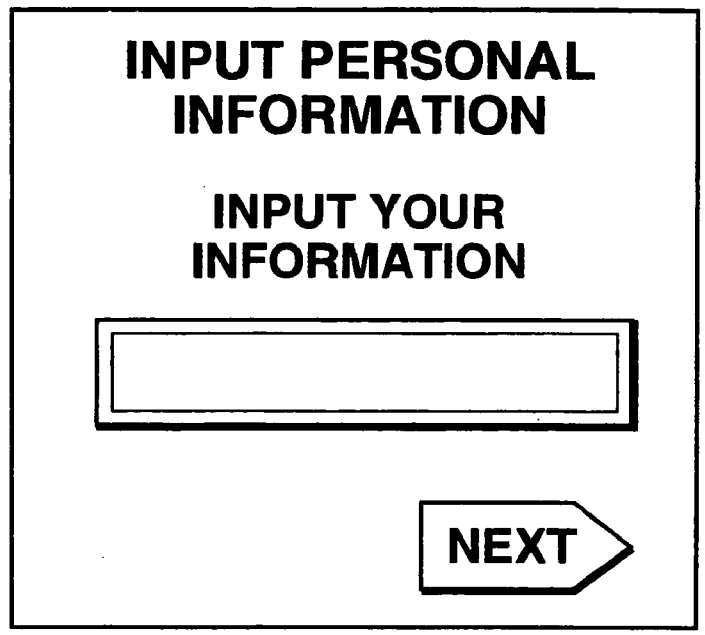
FIG. 11 is a diagram showing an information input screen displayed on the printer.

FIG. 10 is a flowchart showing an operation example of the printer 24 shown in FIG. 1. First, in S501, the image is displayed, for example, as shown in FIG. 11, and the user's own information is inputted on the image. The own information corresponds, for example, to a password, user ID, or the like. In S502, the user authentication is executed, and it is judged whether the inputted user's own information agrees/disagrees, for example, with the user's own information registered in the print server 22. Here, when the own information disagree with each other, in S503, display is performed to the effect that the user's information is invalid and no authentication can be performed. On the other hand, when the authentication of the user is completed, the processing shifts to S504.

Figure 12:
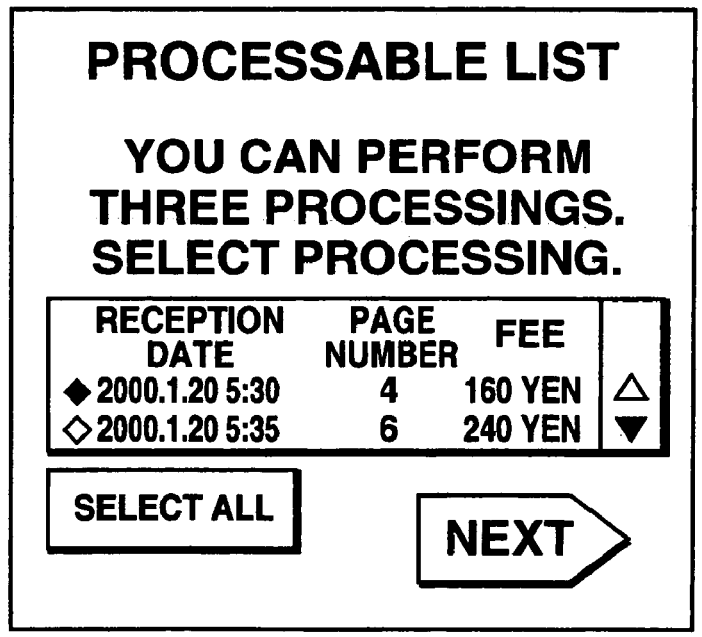
FIG. 12 is a diagram showing a list browsing screen displayed on the printer.
Figure 13:
FIG. 13 is a diagram showing a fee confirmation screen displayed on the printer.

Prior to the execution of S504, for example, as shown in FIG. 12, a list of information to be printed for each user is displayed, thereby allowing the user to select the information to be actually printed. In this case, the list includes a reception date, page number, print fee, and the like. Of course, the identifier of the information to be printed, and the like may be added to the list. In S504, the user is requested to confirm whether or not to agree with charging of the fee. In this case, for example, an image is displayed as shown in FIG. 13. Here, when the user fails to agree with the charging, it is judged in S505 whether or not to discontinue the processing. In a case in which the user confirms that there is no agreement with the charging, in S506 the image is displayed to the effect that no agreement can be obtained and the processing is discontinued, and steps on and after S501 are executed.

Figure 14:
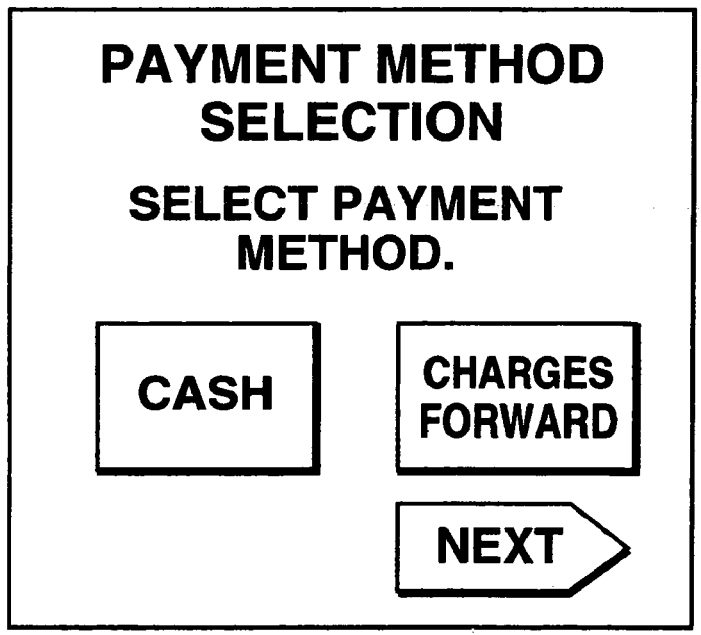
FIG. 14 is a diagram showing a payment method selection screen displayed on the printer.
Figure 15:
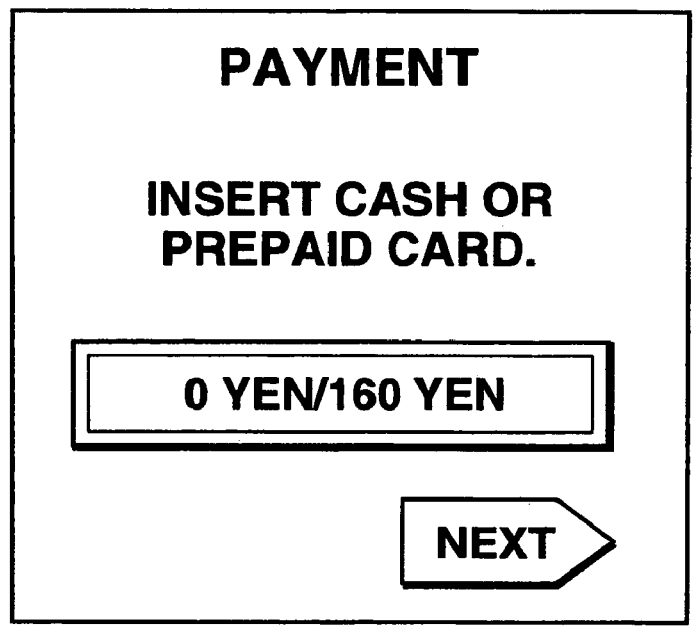
FIG. 15 is a diagram showing a payment instruction screen displayed on the printer.
Figure 16:
FIG. 16 is a diagram showing the payment instruction screen displayed on the printer.

On the other hand, when the agreement with the charging is confirmed in S504, S507 is executed. In S507, for example, first as shown in FIG. 14, an image which urges the user to select a payment method is displayed. For example, cash on delivery or charges forward is selected. In this case, for example, when the user wants payment by a prepaid card, an image is displayed as shown in FIG. 15, so that the user may be urged to insert the prepaid card. Moreover, when the user wants the payment by a credit card, an image is displayed as shown in FIG. 16, so that the user may be urged to insert the credit card. Furthermore, for example, settlement may be performed in cooperation with an external settlement system 26 shown in FIG. 1.

In any case, collection of the fee is executed by a fee collection system in S507 and this is confirmed. For example, the fee collector 64 shown in FIG. 5 is an apparatus for collecting cash. When a necessary amount of cash is inserted into the fee collector 64, steps on and after S508 are executed.

In S508, for example, the information to be printed (PDL file) is taken onto the printer 24 from the print server 22, the PDL file is then interpreted, and each page image is formed. Subsequently, in S509 each page image is printed on the sheet. In S510, for example, the accounting information or the information on job disposal is recorded on the accounting table shown in FIG. 5 or a job management table shown in FIG. 4. Executed in S511 is a processing of deleting the PDL file stored in one or both of the printer 24 and the print server 22.

The accounting information or the information of job disposal may be constituted in such a manner that the information can be referred to from the terminal apparatus 12 as occasion demands. This constitution has an advantage that the information printed by oneself in the past, processing situation, and the like can be specified utilizing the terminal apparatus 12. Moreover, in the aforementioned embodiment the PDL file is deleted immediately after the completion of printing as shown in S511, but instead of performing this uniform deletion, as occasion demands, the PDL file may be stored for re-printing, and deleted after elapse of a fixed period. Furthermore, this deletion can be executed manually by the user or the system manager. Additionally, by issuing a deletion request from the terminal apparatus 12, and processing the request by the print server 22, the electronic mail or the PDL file as an object may be deleted.

Moreover, in the aforementioned embodiment, in a case in which the empty capacity of the storage apparatus on the system decreases so that any newly received mail cannot be received as shown in FIG. 9, if the electronic mail indicating that reception is impossible is transmitted to the terminal apparatus 12 having issued the print request at the time, instead of the transmission, by monitoring this situation beforehand in the output destination management server 16, a message indicating that no print processing can be performed under existing circumstances may be returned on receiving the search request from the terminal apparatus 12.

Figure 17:
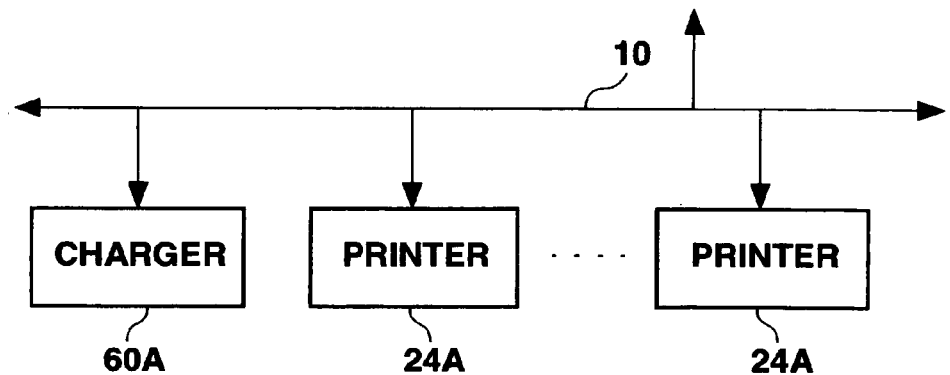
FIG. 17 is a block diagram showing a constitution for performing an accounting processing with respect to a plurality of printers with one charger.
Figure 18:
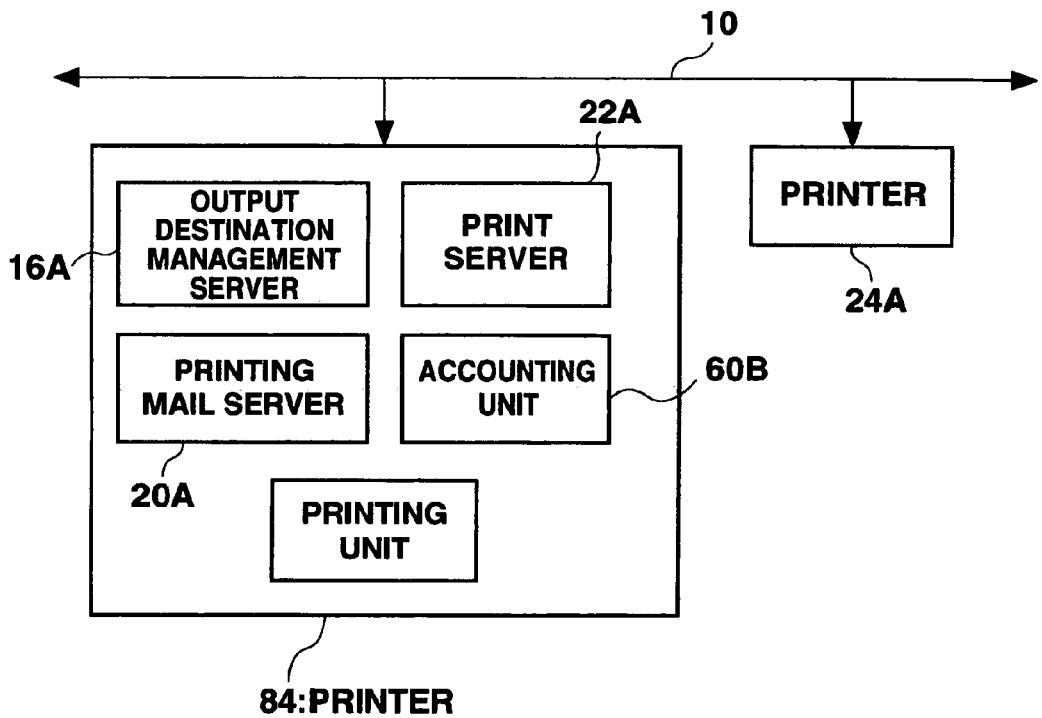
FIG. 18 is a block diagram showing a constitution of the printer on which various servers are mounted.

Furthermore, in the aforementioned embodiment, as shown in FIG. 5, each printer 24 is provided with the charging unit 60 but, for example, by disposing a charger 60A separately from a printer 24A as shown in FIG. 17, it is also possible to collectively perform the charging processing with respect to a plurality of printers 24A on the charger 60A. Additionally, in the aforementioned embodiment, the printer 24 is constituted separately from the respective servers 16, 20, 22 but, as shown in FIG. 18, any printer 84 may be provided with an output destination management server 16A, a printing mail server 20A, a print server 22A, further a charging unit 60B and a printing unit. In this case, the integrated printer 84 manages its print processing, and additionally manages another printer 24A.

Additionally, in the above description, to perform deletion of the PDL file or the like, an electronic mail may be issued beforehand to the terminal apparatus 12 in order to demand confirmation as to whether the deletion may be performed or not. Alternatively, the issuance of the electronic mail may be combined with the deletion of the file after the fixed period.

According to the aforementioned constitution, in a case in which the information from the terminal apparatus is outputted, there is an advantage that the appropriate output apparatus can be selected and the transmission of the information can rationally be performed utilizing the existing communication tool. Moreover, when the information output service is performed, a compensation for the service can be collected under the rational accounting system.

What is claimed is:

1. An information output system comprising:
   a managing section for managing a mail address for each output printing apparatus of an output printing apparatus group;
   a search section for searching the output printing apparatus group managed by the managing section for one candidate output printing apparatus or a plurality of candidate output printing apparatuses in response to a search request having search conditions from a transportable terminal apparatus;
   a notifying section for notifying said transportable terminal apparatus of the mail address of said candidate output printing apparatus or the plurality of candidate output printing apparatuses found in a search by the search section, wherein the transportable terminal apparatus issues an electronic mail to a destination mail address of a designated output printing apparatus, and wherein the destination mail address is based upon the mail address of said candidate output printing apparatus or the plurality of candidate output printing apparatuses provided by the notifying section;
   an accounting processor for performing accounting processing prior to outputting of information included in said electronic mail, and allowing the designated output printing apparatus to produce printed output of the information included in said electronic mail from said transportable terminal apparatus after executing a charging processing; and
   a distinguishing section for distinguishing the designated output printing apparatus from said output printing apparatus group based on the destination mail address of the electronic mail issued from said transportable terminal apparatus, wherein
   said designated output printing apparatus produces printed output of outputting information included in the electronic mail issued from said transportable terminal apparatus, and wherein
   said managing section further manages performance information for each of said output printing apparatuses and manages installation position information for each of said output printing apparatuses, and
   said search section searches for said one candidate output printing apparatus or the plurality of candidate output printing apparatuses based on said performance information, and based on said installation position information.

2. The information output system according to claim 1 wherein the transportable terminal apparatus is capable of sending and receiving electronic mail.

3. An information output system comprising:
   a printer group comprising a plurality of printers;
   a first server comprising an address managing section for managing a mail address for each of said printers, a search section for searching said printer group managed by a managing section for one candidate printer or a plurality of candidate printers in response to a search request having search conditions from a client, and an address notifying section for notifying said client of the mail address of said one candidate printer or the plurality of candidate printers found in a search by the search section, wherein the client issues an electronic mail to a destination mail address of a designated printer, and wherein the destination mail address is based upon the mail address of said candidate printer or the plurality of candidate printers provided by the notifying section;
   an accounting processing section for performing accounting processing prior to outputting of information included in said electronic mail, and allowing the designated output printing apparatus to produce printed output of the information included in said electronic mail from said transportable terminal apparatus after executing a charging processing; and
   a second server comprising a receiving section for receiving the electronic mail issued from said client, a distinguishing section for distinguishing the designated printer from said printer group based on the destination mail address of the electronic mail, and a converting section for converting information included in said electronic mail in accordance with said designated printer, said designated printer prints output of said converted information, and wherein the client provides the search request via a transportable terminal apparatus, and wherein said first server further comprises:
an information managing section for managing performance information and installation position information for each of said printers; and
an information notifying section for notifying said client of at least one of the performance information and the installation position information with respect to said one candidate printer or the plurality of candidate printers.

4. The information output system according to claim 3 wherein the electronic mail is utilized to perform communication between said client and said first server.

5. The information output system according to claim 3, further comprising an authentication apparatus for performing user authentication prior to print processing of said converted information in said designated printer.

6. The information output system according to claim 3 wherein said second server further comprises:
a separating section for separating said electronic mail into a plurality of mail elements; and
an individual managing section for individually managing said respective separated mail elements, and
said information to be printed corresponds to one mail element.

7. The information output system according to claim 3 wherein said second server further comprises:
a storing section in which the information constituting said electronic mail is stored;
a monitor section for monitoring an empty capacity of said storing section; and
a restricting section for restricting reception of a print request in accordance with lack of capacity of said storing section.

8. The information output system according to claim 3 wherein said converting section converts the information included in said electronic mail to a PDL file in accordance with said designated printer.

9. The information output system according to claim 3 wherein said second server further comprises a virus processing section for executing a virus check with respect to said electronic mail.

10. The information output system according to claim 7 wherein said second server further comprises a restriction notifying section for notifying said client of reception restriction when the reception of said print request is restricted.

11. The information output system according to claim 8, further comprising:
a storing section for storing said PDL file; and
a deleting section for deleting the PDL file stored in said storing section when a predetermined condition is satisfied.

12. The information output system according to claim 9 wherein said virus processing section comprises:
a report preparing section for preparing a virus check report when it is judged by said virus check that a virus exists; and
a report print control section for performing a control to allow said virus check report to be printed instead of the printing of the information included in said electronic mail in said designated printer when it is judged that said virus exists.

13. The information output system according to claim 12, further comprising an accounting processor for performing accounting processing prior to the printing of said virus check report.

14. An information output system comprising:
a managing section for managing a mail address for each output printing apparatus of an output printing apparatus group;
a search section for searching the output printing apparatus group managed by the managing section for one candidate output printing apparatus or a plurality of candidate output printing apparatuses in response to a search request having search conditions from a transportable terminal apparatus;
a notifying section for notifying said transportable terminal apparatus of the mail address of said one candidate output printing apparatus or the plurality of candidate output printing apparatuses found in a search by the search section, wherein the transportable terminal apparatus issues an electronic mail to a destination mail address of a designated output printing apparatus, and wherein the destination mail address is based upon the mail address of said candidate output printing apparatus or the plurality of candidate output printing apparatuses provided by the notifying section;
a distinguishing section for distinguishing the designated output printing apparatus from said output printing apparatus group based on the destination mail address of the electronic mail issued from said transportable terminal apparatus; and
an accounting processing section for performing accounting processing prior to outputting of information included in said electronic mail, and allowing the designated output printing apparatus to produce printed output of the information included in said electronic mail from said transportable terminal apparatus after executing a charging processing, and wherein
said managing section further manages performance information for each of said output printing apparatuses and manages installation position information for each of said output printing apparatuses,
said search section searches for said one candidate output printing apparatus or the plurality of candidate output printing apparatuses based on said performance information, and based on said installation position information, and
said designated output printing apparatus produces printed output of outputting information included in the electronic mail issued from said transportable terminal apparatus.

15. The information output system according to claim 14 wherein said accounting processing section comprises:
a selecting section for allowing a user to select an accounting system; and
an accounting executing section for performing accounting in accordance with said selected accounting system.

16. An information output method in which electronic mail is utilized, comprising steps of:
managing a mail address for each output printing apparatus and an output printing apparatus group;
searching the output printing apparatus group for one candidate output printing apparatus or a plurality of candidate output printing apparatuses for the mail address in response to a search request having search conditions from a transportable terminal apparatus;
finding the mail address of said one candidate output printing apparatus or the plurality of candidate output printing apparatuses;
notifying said transportable terminal apparatus of the mail address of said one candidate output printing apparatus or the plurality of candidate output printing apparatuses, wherein the transportable terminal apparatus issues an electronic mail to a destination mail address of a designated output printing apparatus, and wherein the destination mail address is based upon the mail address of said candidate output printing apparatus or the plurality of candidate output printing apparatuses provided by the notifying section;

distinguishing the designated output printing apparatus from said output printing apparatus group based on the destination mail address of the electronic mail issued from said transportable terminal apparatus; and outputting printed information included in the electronic mail issued from said transportable terminal apparatus by said designated output printing apparatus, and wherein the method further comprises:

managing performance information for each of said output printing apparatuses and managing installation position information for each of said output printing apparatuses, searching for said one candidate output printing apparatus or the plurality of candidate output printing apparatuses based on said performance information and based on said installation position information, and performing accounting processing prior to outputting of information included in said electronic mail, and allowing the designated output printing apparatus to produce printed output of the information included in said electronic mail from said transportable terminal apparatus after executing a charging processing.

17. A storage medium in which a program to be executed on a computer is stored, said program comprising:

a module for managing a mail address for each output printing apparatus and an output apparatus group;

a module for searching the output printing apparatus group for one candidate output printing apparatus or a plurality of candidate output printing apparatuses for the mail address in response to a search request having search conditions from a transportable terminal apparatus;

a module for finding the mail address of said one candidate output printing apparatus or the plurality of candidate output printing apparatuses;

a module for notifying said transportable terminal apparatus of the mail address of said one candidate output printing apparatus or the plurality of candidate output printing apparatuses, wherein the transportable terminal apparatus issues an electronic mail to a destination mail address of a designated output printing apparatus, and wherein the destination mail address is based upon the mail address of said candidate output printing apparatus or the plurality of candidate output printing apparatuses provided by the notifying section;

a module for performing accounting processing prior to outputting of information included in said electronic mail, and allowing the designated output printing apparatus to produce printed output of the information included in said electronic mail from said transportable terminal apparatus after executing a charging processing; and a module for distinguishing a designated output printing apparatus from said output printing apparatus group based on the destination mail address of the electronic mail issued from said transportable terminal apparatus, wherein said designated output printing apparatus produces printed output of outputting information included in the electronic mail issued from the transportable terminal apparatus, and wherein said module for managing further manages performance information for each of said output printing apparatuses and further manages installation position information for each of said output printing apparatuses, and said module for searching searches for said one candidate output printing apparatus or the plurality of candidate output printing apparatuses based on said performance information and based on said installation position information.

18. An information output system comprising:

an output printing apparatus group comprising a plurality of output printing apparatuses;

a transportable terminal apparatus provided with an electronic mail transmission/reception function;

a first mail server for presenting an electronic mail transmission/reception service to said transportable terminal apparatus;

a first management server comprising a managing section for managing a mail address for each of said output printing apparatuses, a search section for searching the output apparatus group managed by the managing section for one candidate output printing apparatus or a plurality of candidate output printing apparatuses in response to a search request having search conditions from said transportable terminal apparatus, and a notifying section for notifying said transportable terminal apparatus of the mail address of said one candidate printing output apparatus or the plurality of candidate output printing apparatuses found in a search by the search section, wherein the transportable terminal apparatus issues an electronic mail to a destination mail address of a designated output printing apparatus, and wherein the destination mail address is based upon the mail address of said candidate output printing apparatus or the plurality of candidate output printing apparatuses provided by the notifying section;

an accounting processor for performing accounting processing prior to outputting of information included in said electronic mail, and allowing the designated output printing apparatus to produce printed output of the information included in said electronic mail from said transportable terminal apparatus after executing a charging processing;

a second mail server for receiving the electronic mail issued from said transportable terminal apparatus; and a second management server comprising a distinguishing section for distinguishing a designated output printing apparatus from said output printing apparatus group based on the destination mail address of said received electronic mail, and a presenting section for presenting information included in said electronic mail to said designated output printing apparatus, wherein said designated output printing apparatus produces printed output of outputting information included in the electronic mail issued from the transportable terminal apparatus, and wherein said managing section further manages performance information for each of said output printing apparatuses and manages installation position information for each of said output printing apparatuses, and said search section searches for said one candidate output printing apparatus or the plurality of candidate output printing apparatuses based on said performance information, and based on said installation position information.

* * * * *